United States Patent [19]

Hediger

[11] Patent Number: 4,861,052
[45] Date of Patent: Aug. 29, 1989

[54] SLED DOG TRAINING CART

[76] Inventor: Ernst H. Hediger, Rte. 3, Box 89, Chapel La., Neillsville, Wis. 54456

[21] Appl. No.: 290,633

[22] Filed: Dec. 27, 1988

[51] Int. Cl.$^4$ .............................................. B62C 7/00
[52] U.S. Cl. .............................................. 280/87.043
[58] Field of Search .......... 280/87.01, 79.1 R, 79.1 A, 280/79.2, 87.041, 87.043

[56] References Cited

U.S. PATENT DOCUMENTS

| 576,617 | 2/1897 | Rotharmel | 280/47.11 |
| 1,479,871 | 1/1924 | Pearson | 280/23 |
| 1,481,520 | 1/1924 | Maki | 280/23 |
| 1,606,425 | 11/1926 | Johanson | 280/23 |
| 1,698,165 | 1/1929 | Martin | 280/87.043 |
| 1,711,418 | 4/1929 | Linden | 280/87.043 |
| 1,755,299 | 4/1930 | Linden | 280/87.043 |

Primary Examiner—Charles A. Marmor
Assistant Examiner—Richard Camby
Attorney, Agent, or Firm—Norman B. Rainer

[57] ABSTRACT

A four wheeled cart is provided for the training of sled dogs. The cart is also adaptable to use with other towing devices and for other purposes. The cart is comprised of a chassis having paired steerable front wheels and paired rear wheels mounted upon a stationary axle. A body is removably disposed upon the chassis. A platform disposed rearwardly of the chassis is provided for the operator to stand upon. Steering and braking controls are conveniently located with respect to the platform.

8 Claims, 4 Drawing Sheets

SLED DOG TRAINING CART

BACKGROUND OF THE INVENTION

This invention relates to rolling carts which are primarily towed by sled-dogs but which may be towed by various means. Such carts are usually comprised of a chassis having wheels, steering means, braking means, a platform for carrying driver and cargo, and means for hitching the cart to dogs or other towing means. The cart is typically pulled by sled-dogs as a means for training said dogs for pulling sleds on snow. Such carts are used to strengthen dogs and provide aerobic exercise by inducing rolling resistance by means of friction and mass. The cart driver stands at the rear of the cart, providing additional weight while steering. Although primary steering is applied to the cart by the dogs, such carts are pulled over a variety of terrain which require the driver to control the cart, thereby avoiding obstacles in the cart's path. In addition, the driver must control the cart to prevent over-running the dogs, which are generally attached to the cart by flexible tether means.

Carts of the aforementioned type usually have three wheels with hard inflated or solid tires. Such design makes the cart unstable over rough terrain and unable to absorb the shock of hitting bumps on the ground. Steering means are usually of ineffective design, limiting the driver's ability to steer around obstacles and bumps. Furthermore, the hard inflated tires provide for little rolling resistance, which, in conjunction with minimally effective brakes cause the carts to easily over-run and injure the dogs. Earlier carts have not provided secure footing for the driver, said footing being crucial to controlling the cart and avoiding injury. Such carts are often constructed in a manner producing limited shock absorbing capabilities, thereby affording poor durability and high susceptibility to breakage. Earlier carts are often not adapted for use with a variety of towing means, and are thereby limited in their usage. Furthermore, most carts can not be easily disassembled. Therefore, transporting such carts is difficult, and usage is limited.

It is therefore an object of the present invention to provide a four-wheeled cart which will absorb the shocks and stresses of rough terrain, while keeping all wheels on the ground simultaneously.

It is a further object of this invention to provide a cart as in the foregoing object having rearwardly disposed means upon which the driver stands while controlling operation of the cart.

It is another object of this invention to provide a cart of the aforesaid nature having effective steering and braking means.

It is yet another object of the present invention to provide a cart of the aforementioned type which may be towed by a variety of means.

It is a still further object of the invention to provide a cart of the aforementioned type which can be easily disassembled for storage, transport, or repair.

It is an additional object of this invention to provide a cart of the aforementioned type having interchangeable cargo platforms which facilitate alternative uses of the cart.

SUMMARY OF THE INVENTION

The above and other beneficial objects and advantages are accomplished in accordance with the present invention by a sled-dog training cart comprised of:

(a) a chassis having a longitudinal support member centered upon an axis oriented in the general direction of motion of the cart, said longitudinal support member having front and rear extremities, a forward support member attached at its midpoint to said front extremity in a manner permitting pivotal movement in a vertical plane, a stationary axle attached at its midpoint to said rear extremity, said forward support member and stationary axle terminating in lateral extremities, and diagonally disposed struts extending from said front extremity to the lateral extremities of said stationary axle, (b) front wheels mounted upon stand off arms associated with the lateral extremities of said forward support member in a manner constraining said wheels to rotation in parallel vertical planes angularly positionable with respect to said forward support member, (c) rear wheels mounted at the lateral extremities of said stationary axle in a manner to rotate in fixed parallel vertical planes, (d) a brake system comprised of drum type brake means associated with said rear wheels, said brake means having activating levers, and rigid brake pedal means in operative joinder with said levers, (e) a body removably mounted upon said chassis and comprised of a cargo platform having rearwardly directed foot platform means, upright structure disposed between said cargo platform and foot platform means, and left and right side frame means disposed above said cargo platform forward of said upright structure, and (f) a steering system comprised of a handlebar pivotably associated with said upright structure and adapted to raise and lower a control rod, said control rod having an upper extremity pivotably associated with said handlebar and a lower exremity pivotably associated with a control linkage, and a steering shaft adapted for longitudinal reciprocating motion and having forward and rear extremities, said rear extremity pivotably associated with said linkage and said forward extremity pivotably associated with a steering yoke, said yoke pivotably connected to said longitudinal support member and extending forwardly therefrom, and left and right tie rods having proximal and distal extremities, said proximal exremities pivotably associated with said yoke and said distal extremities pivotably associated with said stand off arms and adapted to turn said front wheels about the extremities of said forward support member in response to pivotal movement of said yoke.

In a preferred embodiment, said front and rear wheels are of inflatable balloon type ATV tires, such as Cheng Shin V-tread type model number 1760T, in order to absorb the shocks of rough terrain.

The components of said chassis are preferably constructed of tubular mild steel, which provides light weight and good durability. Such construction also provides for easy repair, safety for the driver, energy absorbtion, and impact resistance in the event of a crash of the cart.

Locking pins which facilitate rapid disassembly are used preferably to secure the body to the chassis, said railings to said platform and upright structure, and said control linkage to said steering rod.

Drum type brakes such as Dico part number 16686, are preferably employed within said rear wheels. The yoke is preferably adapted for use with a variety of towing means.

The foot platform means may be constructed from expanded steel to improve traction for the driver and thereby improve control of the cart.

BRIEF DESCRIPTION OF THE DRAWING

For a fuller understanding of the nature and objects of the invention. reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENTS

Figure 1:
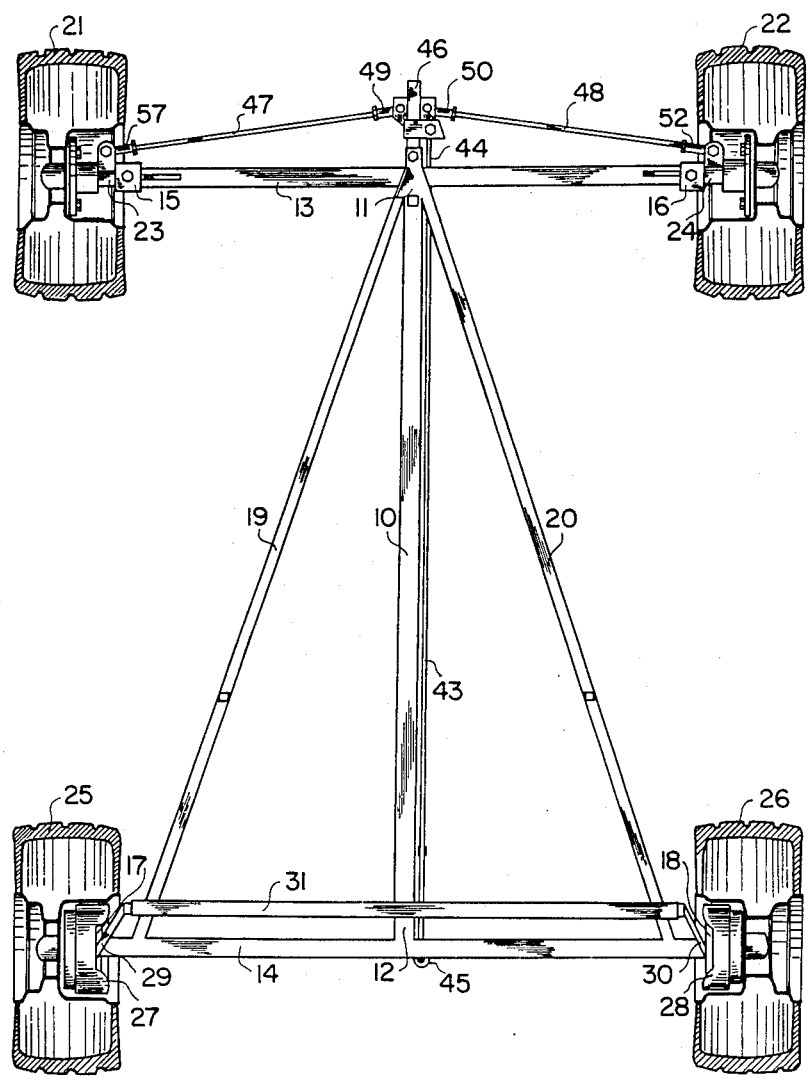
FIG. 1 is a top view of an embodiment of the cart of the present invention with the body removed.
Figure 2:
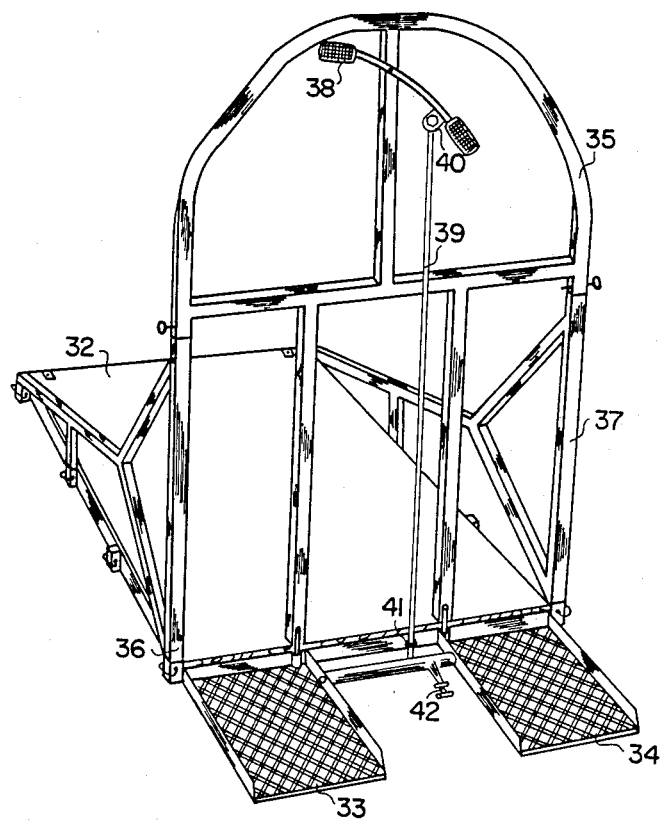
FIG. 2 is a perspective rear view of the cart.
Figure 3:
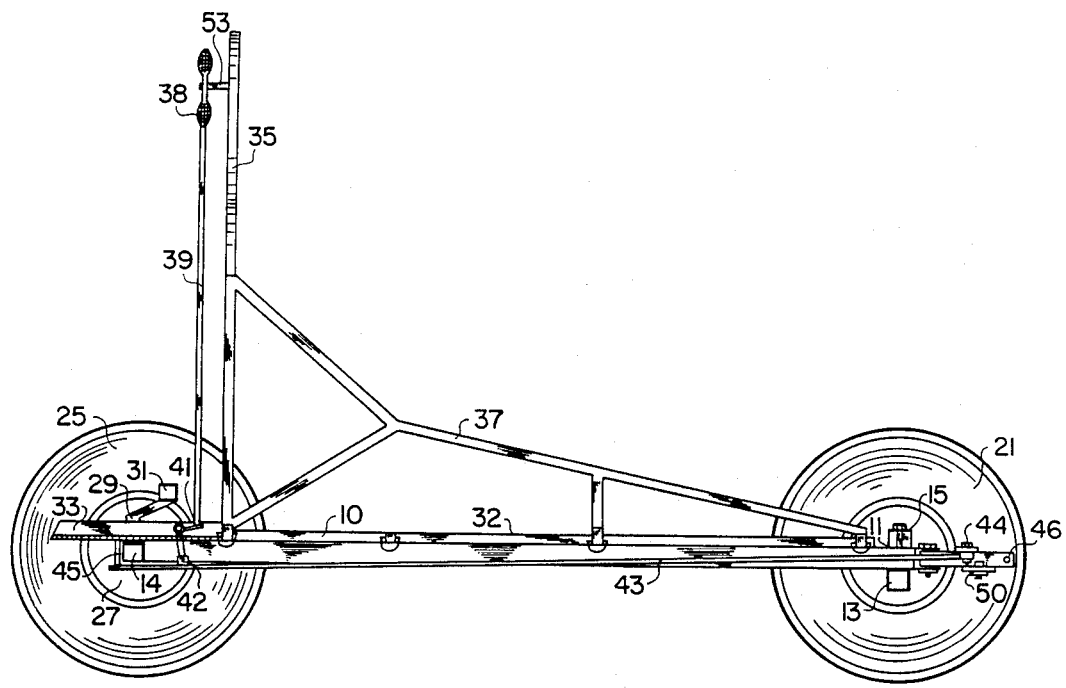
FIG. 3 is a view of the right side of the cart of FIG. 2, with parts removed to reveal interior details.
Figure 4:
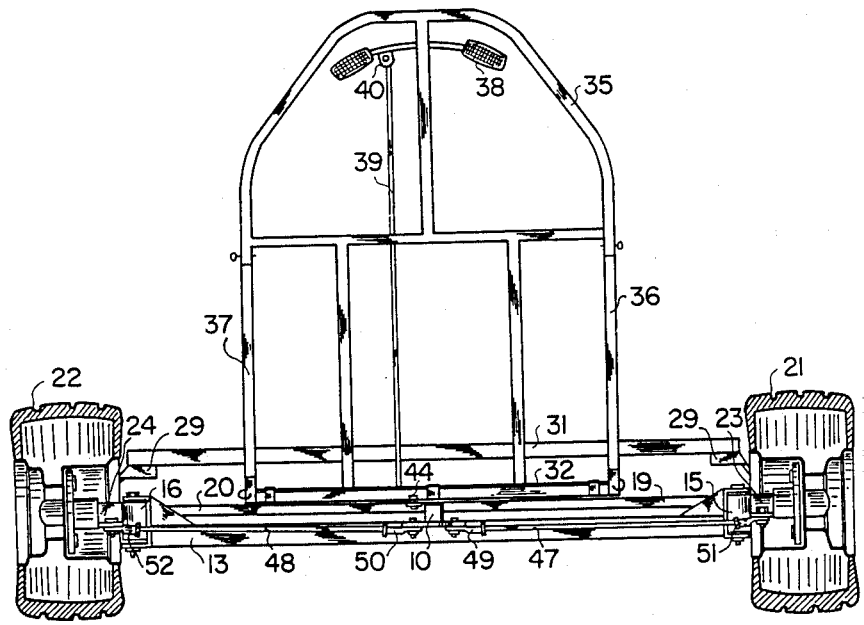
FIG. 4 is a front view of the cart of FIG. 2.

Referring to FIGS. 1-4, an embodiment of the sled-dog training cart of the present invention is shown built upon a chasis having a longitudinal support member 10 centered upon an axis oriented in the general direction of motion of the cart, said longitudinal support member having front and rear extremities 11 and 12, respectively. A forward support member 13 is pivotably attached at its midpoint to said front extremity 11. A stationary axle 14 is attached at its midpoint to said rear extremity 12. Forward support member 13 and stationary axle 14 are coplanar and perpendicularly disposed to said support member 10, and terminate in lateral extremities 15, 16, 17, and 18. Diagonally disposed struts 19 and 20 extend from front extremity 11 to lateral extremities 17 and 18 of stationary axle 14. Front wheels 21 and 22 are mounted upon stand off arms 23 and 24 pivotably attached to lateral extremities 15 and 16 in a manner constrainting wheels 21 and 22 to rotation in parallel vertical planes angularly positionable with respect to forward support member 13. Rear wheels 25 and 26 are mounted at the lateral extremities 17 and 18 of stationary axle 14 and are adapted for rotation in fixed parallel vertical planes.

A brake system is comprised of drum type brake means 27 and 28 associated with rear wheels 25 and 26, respectively. Said brake means 27 and 28 have activating levers 29 and 30. Rigid brake pedal means 31 transversely spans the chassis in operative joinder with said levers 29 and 30. By exerting foot pressure upon said brake pedal means, the driver activates the brake means to stop or slow the speed of the cart.

A body, mounted upon said chassis, is comprised of a cargo platform 32 having rearwardly directed foot platforms 33 and 34 upon which the driver stands. Upright structure 35, positioned at the rear of platform 32 immediately forward of said foot platforms, provides the driver with means for holding onto the cart. Left and right side railings 36 and 37, respectively, extending upwardly from said platform and forwardly of upright structure 35, provide structural support and serve to contain cargo or passengers.

The steering system is comprised of handlebar 38 connected by pivot pin 53 to upright structure 35, and control rod 39 having an upper extremity 40 pivotably associated with said handlebar and a lower exremity 41 pivotably associated with a control linkage 42. Said linkage 42 is pivotably connected to said body and longitudinally oriented steering shaft 43. Said steering shaft is adapted for longitudinal reciprocating motion and has forward and rear extremities 44 and 45, respectively, said rear extremity 45 being pivotably associated with linkage 42. Forward extremity 44 is pivotably associated with steering yoke 46 pivotably connected to front extremity 11 and disposed forwardly thereof along the longitudinal axis. Left and right tie rods 47 and 48, respectively, each have proximal extremities 49 and 50, respectively, pivotably attached to the forward portion of yoke 46, and distal extremities 51 and 52 respectively, pivotably joined to stand off arms 23 and 24. The tie rods are adapted to turn front wheels 21 and 22 about extremities 15 and 16 of said forward support member upon pivotal movement of yoke 46, effected by the concerted function of steering rod 43, linkage 42, control rod 39, and driveroperated handlebar 38.

Sled dogs are harnessed to said yoke for pulling the cart. The driver rides at the rear of the cart, standing upon the foot platforms and holding onto the upright structure. Primary steering is controlled by the dogs with the driver providing secondary steering by means of said steering system. The driver stops or controls the speed of the cart by exerting pressure on said brake pedal means.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A sled-dog training cart comprised of:
   (a) a chassis having a longitudinal support member centered upon an axis oriented in the general direction of motion of the cart, said longitudinal support member having front and rear extremities, a forward support member attached at its midpoint to said front extremity in a manner permitting pivotal movement in a vertical plane, a stationary axle attached at its midpoint to said rear extremity, said forward support member and stationary axle terminating in lateral extremities, and diagonally disposed struts extending from said front extremity to the lateral extremities of said stationary axle.
   (b) front wheels mounted upon stand off arms associated with the lateral extremities of said forward support member in a manner constraining said wheels to rotation in parallel vertical planes angularly positionable with respect to said forward support member,
   (c) rear wheels mounted at the lateral extremities of said stationary axle in a manner to rotate in fixed parallel vertical planes,
   (d) a brake system comprised of frum type brake means associated with said rear wheels, said brake means having activating levers, and rigid brake pedal means in operative joinder with sid levers,
   (e) a body removably mounted upon said chassis and comprised of a cargo platform having rearwardly directed foot platform means, upright structure disposed between said cargo platform and foot platform means, and left and right side frame means disposed above said cargo platform forward of said upright structure, and (f) a steering system comprised of a handlebar pivotably associated with said upright structure and adapted to raise and lower a control rod, said control rod having an upper extremity pivotably associated with said handlebar and a lower exremity pivotably associated with a control linkage, and a steering shaft adapted for longitudinal reciprocating motion and having forward and rear extremities, said rear extremity pivotably associated with said linkage and said forward extremity pivotably associated with a steering yoke, said yoke pivotably connected to said longitudinal support member and extending forwardly therefrom, and left and right tie rods having proximal and distal extremities, said proximal extremities pivotably associated with said yoke and said distal extremities pivotably associated with said stand off arms and adapted to turn said front wheels about the extremities of said forward support member in response to pivotal movement of said yoke.

2. The cart of claim 1 wherein said front and rear wheels are inflatable balloon type all-terrain vehicle tires.

3. The cart of claim 2 wherein said tires have a V design tread.

4. The cart of claim 1 constructed in a manner permitting rapid disassembly.

5. The cart of claim 4 wherein said disassembly is facilitated because various components are held in an interconnected state by means of locking pins.

6. The cart of claim 1 wherein drum type brakes are employed in association with said rear wheels.

7. The cart of claim 1 wherein said yoke is configured for use with a variety of towing means.

8. The cart of claim 1 wherein said foot platform means is constructed of expanded steel.

* * * * *